United States Patent Office 3,351,862
Patented Nov. 7, 1967

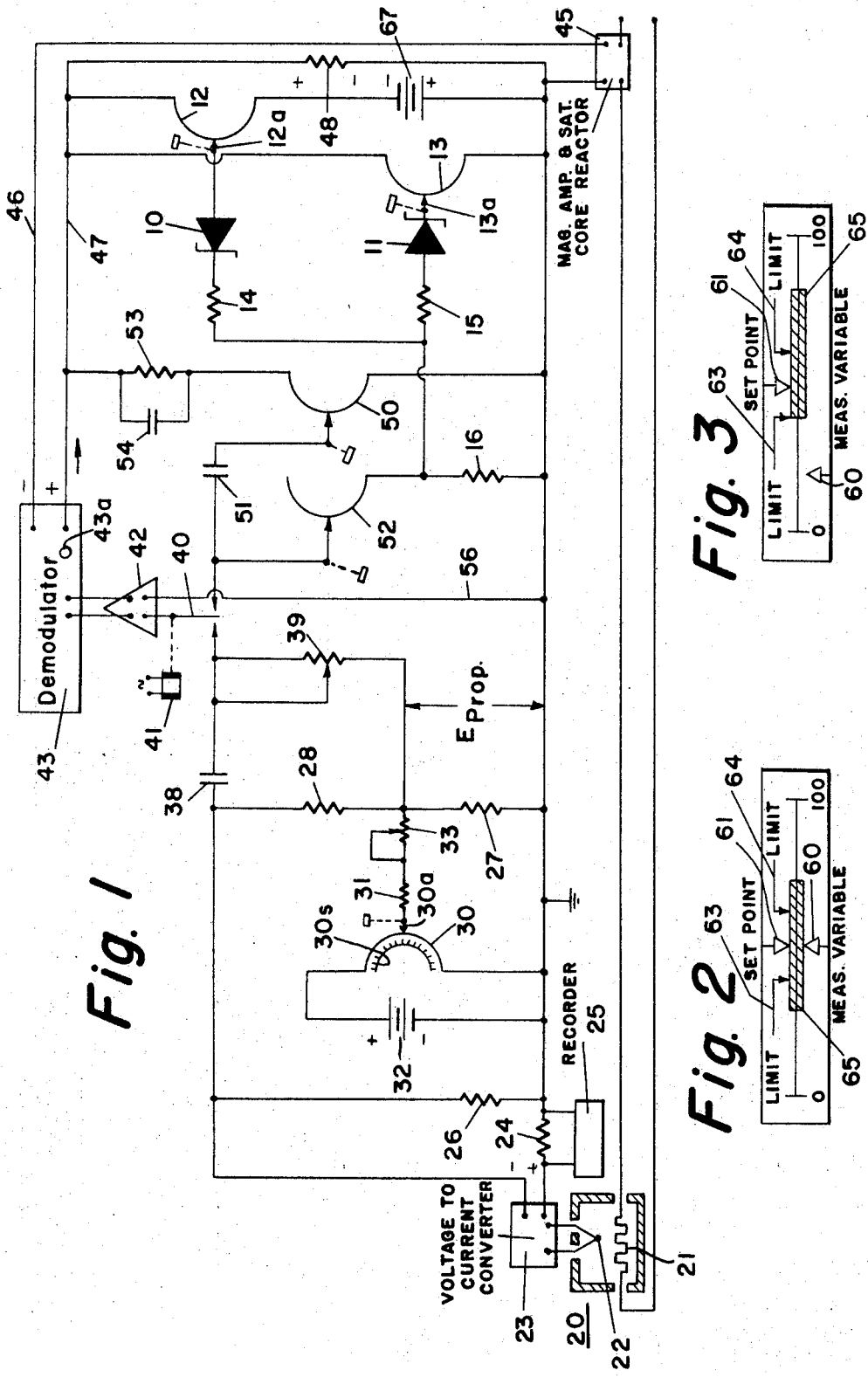

3,351,862
CONTROL SYSTEM HAVING PROPORTIONAL BAND SHIFT-LIMITING CIRCUIT
Edward J. Cranch, Bryn Athyn, Pa., assignor to Leeds & Northrup Company, a corporation of Pennsylvania
Filed July 29, 1963, Ser. No. 298,055
4 Claims. (Cl. 328—28)

This invention relates to control systems for regulating the operation of a final control element to maintain the magnitude of a condition at a selected value and has for an object the provision of means for limiting the extent of shift of the proportional band due to reset action.

The present invention provides improvements upon systems of the type disclosed in Davis Patent 2,666,170 and Cranch et al. Patent 3,092,321. In control systems of the foregoing type, the gain of the system may be expressed in terms of the proportional band, which is the percent change in the measured variable required to operate the final control element from one to the other of its limits. For a 100% proportional band setting, and control conditions assumed to be such that a measured variable reading of 50% of scale causes the final control element to be half way between its limits, then the proportional band can be thought of as an actual band or scale of final control element values, superimposed on the measured variable scale and coinciding with it. For proportional control action, then, the reading of the measured variable pointer on the superimposed proportional band scale will indicate the final control element value—100% at the low end of the measured variable scale and 0% at the high end. Increasing or decreasing the proportional band setting of the controller will expand or contract this proportional band scale, so that it covers more or less than the full measured variable scale. For example, a 20% proportional band setting means that the complete proportional band scale of final control element values will cover only 20% of the measured variable scale.

Reset action shifts the band up or down the measured variable scale depending upon the extent of the deviation of the measured variable from its set point. Specifically the shift is in accordance with the integral of the deviation of the measured variable from its set point. Thus as the load on the process increases, requiring more output to keep the measured variable at its set point, the band moves upscale. It may continue upscale even until its lower end is at the set point, if nothing less than full output is needed to maintain the measured variable at set point.

In starting up a batch or non-continuous type process, the measured variable is well below the set point for an extended period of time. Reset action moves the proportional band upscale. When its lower end coincides with the low measured variable reading, the final control element is at its 100% limit. Reset action then continues to move the band upscale. Unless provisions are made to restrain the extent of that movement, the band may be shifted upscale until its lower end coincides with the set point. The measured variable must now increase all the way to the set point before any reduction in output starts to take place. This gives rise to a large overshoot of the measured variable above the set point during the time when reset action is moving the band downscale again to obtain the final control element setting required to maintain the measured variable at the set point.

It is an object of the present invention to limit the extent of the movement of the proportional band to a point where the lower end thereof is at a selected value below the set point.

In carrying out the invention in one form thereof, there is provided in conjunction with means for shifting a given proportional band a control circuit including a Zener diode which in the reverse direction is normally non-conductive but which breaks down when the magnitude of the controller output exceeds a predetermined amount, thereby limiting, by flow of current through the Zener diode and through a part of the control circuit, by a selected amount the extent to which the lower end of the proportional band can approach the set point.

For further objects and advantages of the invention and for a detailed discussion of a typical preferred embodiment thereof, reference is to be had to the following description taken in conjunction with the accompanying drawing in which:

FIG. 1 diagrammatically illustrates a system embodying the invention; and

FIGS. 2 and 3 are illustrative of the results of establishing limits on the extent of shift of the proportional band due to reset action.

Referring now to FIG. 1, it will be observed that the invention has been applied to the automatic control system of FIG. 1 of Cranch et al. Patent 3,092,321, certain of the elements of FIG. 1 of said patent having been omitted in the accompanying FIG. 1 to simplify the disclosure.

In the system of FIG. 1, a pair of Zener diodes 10 and 11 are connected in circuits extending respectively from contacts 12a and 13a of slidewire potentiometers 12 and 13. These contacts may be adjusted from their illustrated mid-positions to predetermine the limit to which the proportional band may be shifted and by reason of reverse current flow through one or the other of the Zener diodes and by way of one or the other of resistors 14 and 15 and a resistor 16 to ground. The manner in which the limit on the shift of the proportional band is accomplished will be explained in detail after brief consideration of the system as a whole.

As shown, the automatic control system of FIG. 1 is designed to maintain the temperature of a furnace 20 at a selected set point. The furnace is heated by any suitable means, such as heating resistor 21, and its temperature is measured by means of a thermocouple 22 connected to a voltage-to-current converter 23, which is preferably of the type disclosed in McAdam et al. Patent 2,901,563. The converter 23 functions to transform the voltage output of the thermocouple 22 into a current output. The current from the converter 23 flows through a series resistor 24 across which there is connected a recorder 25 for indicating and recording the temperature of furnace 20. The recorder 25 is effective to indicate and record tempertaure since the current through resistor 24 is proportional to said temperature.

From resistor 24, a part of the current flows by way of a current-dividing resistor 26 with the remainder flowing through a summing resistor 27 and a current-dividing resistor 28. The relative magnitudes of the resistors 26 and 28 determine the ratio of the current division between the branch circuits respectively including resistors 26 and 28. It is to be mentioned that the resistors 31 and 32 of Patent 2,901,563 correspond with resistors 24 and 26 of FIG. 1 of the accompanying drawing.

As the magnitude of the control variable, the temperature of furnace 20, varies so does the current flow through the branch circuit including resistors 27 and 28. Accordingly, there is developed across resistor 27 a potential difference $E_{Prop.}$ proportional to the magnitude of the current flow through resistor 27. In order to establish an output voltage or potential difference proportional to the deviation in magnitude of the controlled variable from a desired value, there is provided a variable resistor 30 of the slidewire type having an adjustable contact 30a. There is connected in series with contact 30a a high-valued resistor 31 of the order of 20,000 ohms, with resistor 27 of the order of 2400 ohms, and slidewire 30 of the order of 1,000 ohms. Thus, resistor 31 is provided to produce a swamping action, that is to say, to make the current flow through resistor 31 directly proportional to the change in position of contact 30a on resistor 30. Resistor 30 is connected to a constant voltage source shown as a battery 32.

A rheostat 33 is preferably included in series with resistor 31 and is used for calibrating purposes, i.e., so that the position of the contact 30a along the scale 30s will be indicative of the desired magnitude of the measured variable, the temperature of furnace 20. Thus, by adjustment of contact 30a there will be produced a set point, meaning the selection of temperature at which the furnace 20 should be maintained. The converter 23 and source 32 are so connected that current tends to flow upwardly through resistor 27 from the converter 23 and downwardly from the source including slidewire contact 30a. It will be seen at once that the potential difference, labeled $E_{Prop.}$, will be proportional to the difference between the two currents and the polarity will be determined by the current having the larger magnitude.

A capacitor 38 and a variable resistor 39 provide for rate action, i.e., a component of control action proportional to the rate of change of the controlled variable. A voltage or potential difference proportional to the rate action is developed across the resistor 39 and the algebraic sum of this voltage and the voltage $E_{Prop.}$ is applied to a stationary contact of a single-pole double-throw vibrator 40 having an operating coil 41 connected to a suitable source of alternating current supply, for example, 60 cycles per second. A negative feedback voltage, later to be described, is applied to the other stationary contact. Operation of the movable pole of the vibrator 40 applies to an amplifier 42 a voltage having a 60-cycle component of magnitude proportional to the difference between the deviation voltage and a feedback voltage and of phase dependent upon which of the two voltages is the larger. When the two voltages are of equal magnitude, the input to amplifier 42 is zero. The amplifier 42 is a high gain amplifier.

The alternating current output of amplifier 42 is applied to a demodulator 43, such as shown in the aforesaid Patent 2,901,563, to produce a direct current of magnitude dependent upon whether the alternating current input to the demodulator 43 is of one phase or an opposite phase. Normally amplifier 42 is adjusted to produce a direct current output from the demodulator 43 of half its maximum value with zero input to amplifier 42. The demodulator 43 may be considered as including the direct current amplifying stage of Patent 3,092,321 and including as well an adjusting knob 43a for predetermining the magnitude of the maximum value of heating current to be supplied to the heating resistor 21 under the control of a magnetic amplifier and saturable core reactor 45 of the type available from Fidelity Instrument Corporation, such as its Model #1147.

The current flow from the demodulator 43 will be by way of conductors 46 and 47 in which circuit there is included a feedback resistor 48 corresponding with feedback resistor 60 of FIG. 1 of aforesaid Patent 3,092,321. This feedback resistor 48 develops a negative feedback voltage for application to the right-hand stationary contact of the vibrator 40. In view of this negative feedback, the amplifier 42 maintains the potential of the right-hand contact of vibrator 40 substantially equal to the potential of the left-hand contact. Thus, a given change in potential at the left-hand contact produces a proportional change in the output current from the demodulator 43 which provides a proportional control action. To vary the proportionality, there is provided an adjustable potentiometer 50 in a shunt path across the feedback resistor 48.

In order to provide reset action in the control of the heating current to heating resistor 21, there is associated with the feedback resistor 48 a reset capacitor 51 connected in series with the right-hand contact of vibrator 40, the lower fractional part of a resistor 52 and the resistor 16. A resistor 53 and a capacitor 54 in series with the potentiometer resistor 50 provide a lead network to introduce a phase correction to provide additional stability of the feedback loop. The feedback resistor 48 has a much lower resistance (2300 ohms) as compared with its shunting potentiometer resistor 50 (about 30,000 ohms) to establish resistor 48 as the resistor primarily responsible for the voltage developed in the feedback network. An adjustable fraction of the voltage across resistor 48 is applied by way of potentiometer 50 to the reset capacitor 51.

In order for the voltage, developed across resistors 16 and 52, to be equal and opposite to the voltage applied to the left-hand contact of vibrator 40, it is necessary, for a given fixed input at the left-hand contact, for a constant current to flow through resistors 16 and 52. Flow of current through the adjustable reset resistor 52 and the additional resistor 16 in series therewith charges the reset capacitor 51. Since the capacitor 51 is being charged, the negative feedback voltage must rise if the current through resistors 16 and 52 is to be maintained constant. Otherwise, there would be a fall in potential at the right-hand contact. A small decrease of current through resistors 16 and 52 due to charging of capacitor 51 will increase the output of amplifier 42 and this will increase the current output in lines 46 and 47 and hence there will be an increase in the potential applied to the reset capacitor 51 to maintain a rising negative feedback voltage in compensation for the increased charge on the capacitor 51. The continued increasing flow of current in lines 46 and 47 increases the magnitude of the current flowing to the heating resistor 21. Thus, the capacitor 65 accumulates a charge representative of the time integral of deviation of the controlled variable, the temperature of furnace 20, from the set point.

Assuming now that the temperature of the furnace 20 is at the set point as indicated by the arrow 60, FIG. 2, which is located directly opposite the arrow 61 for the set point, and disregarding for the moment the "limit" arrows 63 and 64, it is to be understood that as an increase in load occurs, causing a decrease in the temperature of furnace 20, the measured variable, arrow 60, will move downscale. The result will be an increase in the output current at conductors 46 and 47 due to the proportional action, and through the action of reset capacitor 51 the current will continue to increase as long as there is deviation of the measured variable from the set point until the current reaches its maximum value.

If the shaded area 65 of FIG. 2 be taken as representative of the proportional band, as defined above, that proportional band by reason of the reset action will be moved upscale.

In the absence of imposed limits, that band will, in the limit, be moved upscale until its lower limit at least coincides with the set point. This means if the controlled variable shall then still be below the set point, the maximum value of heating current will be flowing in heating resistor 21. The final control element, if a valve, will be in its maximum open position corresponding with the flow of maximum current through heating resistor 21.

With the situation as described, if the temperature of furnace 20 as a result of the maximum current in heating resistor 21 rises to a value equal to the set point, it will be seen that the current at the time the temperature has reached the set point will still be maximum and, hence, the temperature of furnace 20 will continue to rise and must overshoot the set point temperature in order to reduce the current from its maximum value.

Considering the above action in view of the voltages applied to the contacts of vibrator 40, it will be remembered that a decrease of temperature in furnace 20 will result in a positive voltage appearing at the left-hand contact of vibrator 40. The amplifier 42 will produce a proportional increase in the current through lines 46 and 47 and in the voltage applied to the right-hand contact of vibrator 40. The reset capacitor 51 will create a continuing increase in the current through lines 46 and 47 until this current reaches its maximum level. With this current at its maximum, there can be no further increase in the voltage applied to the reset capacitor 51 with the result that this capacitor will charge to a voltage equal to that between the contact of the potentiometer 50 and the conductor 56. Under these circumstances there will be no rebalancing voltage developed across the resistors 52 and 16 and the amplifier 42 will receive an A.C. signal of phase indicative of a demand for increased output current which cannot be satisfied because the output current is already at its maximum value. In order for the output current from the demodulator 43 to be decreased, it is for most practical purposes necessary that the A.C. applied to it by the vibrator 40 reverse its phase. This can only be accomplished when the left-hand vibrator contact relative to conductor 56 changes from a positive polarity to a negative polarity, i.e., when the measured variable becomes greater than the set point. To avoid such overshoot of the set point, there is established in accordance with the present invention adjustable limits 63 and 64 for the shift of the proportional band illustrated by the shaded section 65.

Assuming that the conductor 47 has a positive polarity, it will be seen at once that there will be applied to the cathode of Zener diode 11 a positive potential dependent upon the position of contact 13a on the slidewire 13. At the illustrated mid-point, half the potential developed across resistor 48 will be applied to the cathode of Zener diode 11. If this diode has a breakdown voltage of 9 volts, then as soon as the voltage across resistor 48 exceeds 18 volts the diode 11 will break down and current will flow by way of resistor 15 (100K in value) and, thence, downwardly through resistor 16 (approximately 50K in value). In this manner there is introduced a rebalancing effect into the circuit due to the flow of that current through resistor 16. That current, from Zener diode 11, flows in the same direction as the rebalancing current by way of reset capacitor 51 and reset resistor 52 whose maximum value may be as high as 300 megohms.

Considering now the effect of the Zener diode 11 on the shifting of the proportional band, let us assume that the measured variable, represented in FIG. 3 as arrowhead 60, is well below the set point 61 as would be the case if a new batch had been introduced into the furnace 20 and that the reset capacitor 51 has been fully charged and there is no current flow therethrough. Under these conditions, however, the Zener diode 11 is conductive and a current of magnitude related to the difference between the breakdown voltage of Zener diode 11 and the voltage appearing at the contact 13a of potentiometer 13 flows downwardly through resistor 16. This current results in the right-hand contact of vibrator 40 being maintained at a positive potential relative to the conductor 56. In consequence as the measured variable approaches the set point, a phase reversal in the A.C. signal applied to the amplifier 42 to reduce the current in lines 46 and 47 will occur when the voltage on the left-hand contact of vibrator 40 is less than the voltage maintained on the right-hand contact due to the action of the Zener diode 11 and its associated circuitry. In terms of the control action, this means that the measured variable will enter the proportional band to reduce the heating current to the heating resistor 21 before the measured variable reaches the set point.

The setting of the contact 13a relative to slidewire 13 establishes the voltage maintained on the right-hand contact of vibrator 40 with Zener diode 11 conducting. It thus predetermines the limit 63 below the set point to which reset action can shift the low end of the proportional band when moving the band from left to right. Assuming maximum output current through resistor 48, and thus maximum voltage across slidewire 13, with contact 13a at the low end of slidewire 13, no current will flow through the Zener diode 11 and resistors 15 and 16 and no limiting action will occur. As the contact 13a is adjusted upwardly, it will reach a point where the potential at contact 13a just reaches the breakdown voltage of Zener diode 11, and the limit 63 remains at the set point. As contact 13a is raised above this breakdown point, current through the Zener diode 11 increases to increase the feedback voltage across resistor 16, and the limit 63 is moved downscale a corresponding distance below the set point.

By proper adjustment of contact 13a, it is possible to produce a control action which will permit rapid restoration of the measured variable to the set point following a large deviation therefrom without producing overshoot.

To predetermine the upper limit 64, a bias battery 67 is connected in series circuit relation with the slidewire 12 to establish a negative potential at the illustrated lower end of that slidewire. Thus, with the output current in lines 46 and 47 within its normal operating range, the cathode of Zener diode 10 will be positive with respect to its anode but of magnitude less than its breakdown potential. As the output current decreases due to an excessive temperature in furnace 20, the voltage at contact 12a drops farther below that of conductor 56, and the voltage across the Zener diode 10 increases until the diode 10 breaks down and current will then flow from battery 67 upwardly through resistor 16 in the reverse direction through diode 10 and through the lower half of slidewire 12.

This current flow will maintain the potential of the right-hand contact of vibrator 40 at a negative potential relative to the conductor 56 to provide a limit 64 for the upper end of the proportional band 65 in manner similar to that previously explained for the lower limit 63.

Zener diodes, such for example as type SV418, available from a number of manufacturers are peculiarly applicable to the limit circuits just described for the following reasons. Zener diodes have finite, stable, breakdown voltages and the ability to conduct current in the reverse directions. They also have extremely high reverse current resistances. By taking advantage of these characteristics, there is avoided the need of calibrated sources of supply for providing calibrated back-biased potentials on diodes of conventional type.

What is claimed is:
1. An automatic control system for varying the magnitude of a controlled variable to maintain the magnitude of a controlled variable at a predtermined value, comprising
   a balanceable network including means responsive to deviation of said controlled variable from its set point for unbalancing the same,
   said network including negative feedback means producing a D.C. negative feedback,
   means associated with said negative feedback means for establishing a proportional band,
   a reset capacitor and a reset resistor for automatically shifting that proportional band in accordance with the time integral of departure of said controlled variable from said set point,
   said reset resistor having in series therein a supplemental resistor,
   a pair of Zener diodes each connected in the circuit including said supplemental resistor and each including a variable resistor energized in response to the magnitude of said D.C. negative feedback,
   the polarities of said Zener diodes relative to said circuit through said supplemental resistor being oppositely disposed, and
   a source of potential connected in series with one of said variable resistors whereby one of said diodes establishes one limit for the shifting of said proportion- al band and the other of said diodes establishes another limit for the shifting of said proportional band, one in one direction and the other one in the opposite direction.

2. An automatic control system for varying the magnitude of a control effect to maintain the magnitude of a controlled variable at a predetermined value, comprising means for producing a first D.C. voltage representative of the deviation of the magnitude of said controlled variable from said predetermined value, means for producing a second D.C. voltage representative of the magnitude of said control effect, means including a series-connected capacitance and resistance means connected to said second voltage producing means to produce a flow of current through said resistance means to develop a third D.C. voltage, means responsive to the difference between said first and third voltages for varying the magnitude of said control effect to maintain equality between said first and third voltages, and means including a normally non-conductive Zener diode connected between said means for producing said second voltage and said resistance means for producing an additional current flow through at least a portion of said resistance means when said second voltage exceeds a value sufficient to produce breakdown of said Zener diode whereby said third voltage is maintained at a finite value so long as said first voltage is at a value other than zero.

3. An automatic control system having limited proportional-band shift comprising means including an amplifier for producing a D.C. control effect to regulate the magnitude of a condition, a first network providing the input circuit of said amplifier with a deviation signal corresponding with the deviation of the magnitude of said condition from a set point, and a second network providing the input circuit of said amplifier with a feedback signal derived from said control effect, said second network including first resistance means across which a D.C. voltage is proportional to the existing control effect, capacitance means and second resistance means connected in series across at least part of said first resistance means to provide a component of said feedback signal which varies in accordance with the time integral of said deviation signal, and a Zener diode connected between said first and second resistance means to provide between them a path which is normally non-conductive but becomes conductive when said voltage exceeds the breakdown voltage of said Zener diode so then to provide an additional component of said feedback signal by current through said Zener diode and at least part of said second resistance means.

4. An automatic control system for varying the magnitude of a control effect to maintain the magnitude of a condition at a predetermined value, including means for producing a first effect which varies in accordance with the deviation of the magnitude of said condition from said predetermined value, means including a first resistance means for producing a D.C. voltage which varies throughout a range in accordance with the magnitude of said control effect, means including a second resistance means for producing from said voltage a first rebalancing effect which decreases with time, and means including a pair of Zener diodes connected to provide between said first and second resistance means a normally non-conductive path responsive to said voltage for producing a second rebalancing effect whenever said voltage exceeds by a predetermined amount the breakdown potential of said Zener diodes and of magnitude related to the difference between said voltage and the breakdown voltage of said Zener diodes, said pair of Zener diodes being connected in reverse sense wherein one diode breaks down when said voltage approaches one limit of said range and the other diode breaks down when said voltage approaches the other limit of said range.

References Cited

UNITED STATES PATENTS

| | | | |
|---|---|---|---|
| 3,012,126 | 12/1961 | Ferguson | 219—501 X |
| 3,098,919 | 7/1963 | Paulson. | |
| 3,159,737 | 12/1964 | Dora | 219—499 X |
| 3,178,634 | 4/1965 | Woodley. | |
| 3,219,936 | 11/1965 | Eksten et al. | 318—238 X |
| 3,221,257 | 11/1965 | Ohlson | 328—69 |

ARTHUR GAUSS, *Primary Examiner.*

J. JORDAN, *Examiner.*